US012633475B2

(12) United States Patent
Ota et al.

(10) Patent No.: US 12,633,475 B2
(45) Date of Patent: May 19, 2026

(54) MULTIDIRECTIONAL INPUT DEVICE

(71) Applicant: ALPS ALPINE CO., LTD., Tokyo (JP)

(72) Inventors: Masaki Ota, Miyagi (JP); Tetsu Numata, Miyagi (JP); Masatoshi Ono, Miyagi (JP); Masashi Ito, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 296 days.

(21) Appl. No.: 18/642,405

(22) Filed: Apr. 22, 2024

(65) Prior Publication Data

US 2024/0274381 A1 Aug. 15, 2024

Related U.S. Application Data

(63) Continuation of application No. PCT/JP2022/037833, filed on Oct. 11, 2022.

(30) Foreign Application Priority Data

Nov. 15, 2021 (JP) ................................ 2021-185853

(51) Int. Cl.
*H01H 21/22* (2006.01)
*H01H 9/54* (2006.01)
*H01H 21/04* (2006.01)

(52) U.S. Cl.
CPC .............. *H01H 21/22* (2013.01); *H01H 9/54* (2013.01); *H01H 21/04* (2013.01)

(58) Field of Classification Search
CPC .......... H01H 21/22; H01H 9/54; H01H 21/04; H01H 25/04; H01H 25/041; H01H 25/00; H01H 21/02; H01H 21/12; H01H 21/18; H01H 21/24; H01H 21/36; H01H 23/00; H01H 23/02; H01H 23/04; H01H 23/08;
(Continued)

(56) References Cited

U.S. PATENT DOCUMENTS 11,829,181 B2 * 11/2023 Ito ............................ H01H 3/32
12,105,895 B2 * 10/2024 Endo ....................... H01H 25/04
12,174,654 B2 * 12/2024 Ito ............................ H01H 3/32
(Continued)

FOREIGN PATENT DOCUMENTS

JP 2001-324397 11/2001
JP 2020-119729 8/2020
WO 2020/031501 2/2020

OTHER PUBLICATIONS

International Search Report for PCT/JP2022/037833 mailed on Dec. 20, 2022.

*Primary Examiner* — Lheiren Mae A Caroc
(74) *Attorney, Agent, or Firm* — IPUSA, PLLC

(57) ABSTRACT

A multidirectional input device includes a housing made of an insulating material; an operation lever supported by the housing in a tiltable manner; a tilt detection sensor configured to detect a tilt of the operation lever; and an electrostatic detection circuit configured to detect an electrostatic capacitance formed between an electrostatic detection electrode and a surrounding object, wherein the housing includes a dome-shaped dome portion and an opening provided at a top of the dome portion, the operation lever is inserted through the opening, and the electrostatic detection electrode has an annular portion disposed to surround the opening.

9 Claims, 10 Drawing Sheets

(58) Field of Classification Search
CPC ........ H01H 23/12; H01H 23/14; H01H 23/16; H01H 23/24; H01H 23/28; H01H 23/168
See application file for complete search history.

(56) References Cited

U.S. PATENT DOCUMENTS

2021/0159027 A1 5/2021 Hagiwara et al.
2025/0046546 A1* 2/2025 Okanishi ................ H01H 25/04

* cited by examiner

100

MULTIDIRECTIONAL INPUT DEVICE

CROSS-REFERENCE TO RELATED APPLICATIONS

This application is a continuation application of International Application No. PCT/JP2022/037833, filed on Oct. 11, 2022, and designated the U.S., which is based upon and claims priority to Japanese Patent Application No. 2021-185853, filed on Nov. 15, 2021, the entire contents of which are incorporated herein by reference.

BACKGROUND

1. Field of the Invention

The present disclosure relates to a multidirectional input device.

2. Description of the Related Art

There is an operation device known in the related art. Such an operation device includes a housing having a conductive portion on its surface, an operation unit movably supported by the housing based on an operation by an operation body and capable of capacitively coupling with each of the operation body and the conductive portion, and a detection unit configured to detect a proximity state of the operation body with respect to the operation unit, based on a change in electrostatic capacitance in the conductive portion (e.g., see WO 2020/031501).

SUMMARY

A multidirectional input device according to an embodiment of the present disclosure includes: a housing made of an insulating material; an operation lever supported by the housing in a tiltable manner; a tilt detection sensor configured to detect a tilt of the operation lever; and an electrostatic detection circuit configured to detect an electrostatic capacitance formed between an electrostatic detection electrode and a surrounding object, wherein the housing includes a dome-shaped dome portion and an opening provided at a top of the dome portion, the operation lever is inserted through the opening, and the electrostatic detection electrode has an annular portion disposed to surround the opening.

DESCRIPTION OF EMBODIMENTS

In the related-art operation device, since the conductive portion of the housing and a substrate on which a control unit configured to perform control in response to an operation of the operation unit (operation lever) is mounted are disposed to overlap each other, the electrostatic capacitance of the conductive portion may be undesirably affected.

Thus, it is desirable to provide a multidirectional input device with stable sensitivity of an electrostatic detection electrode.

According to an aspect of at least one embodiment of the present disclosure, a multidirectional input device with stable sensitivity of an electrostatic detection electrode may be provided.

Hereinafter, an embodiment to which a multidirectional input device according to the present disclosure is applied will be described.

EMBODIMENT

Figure 1:
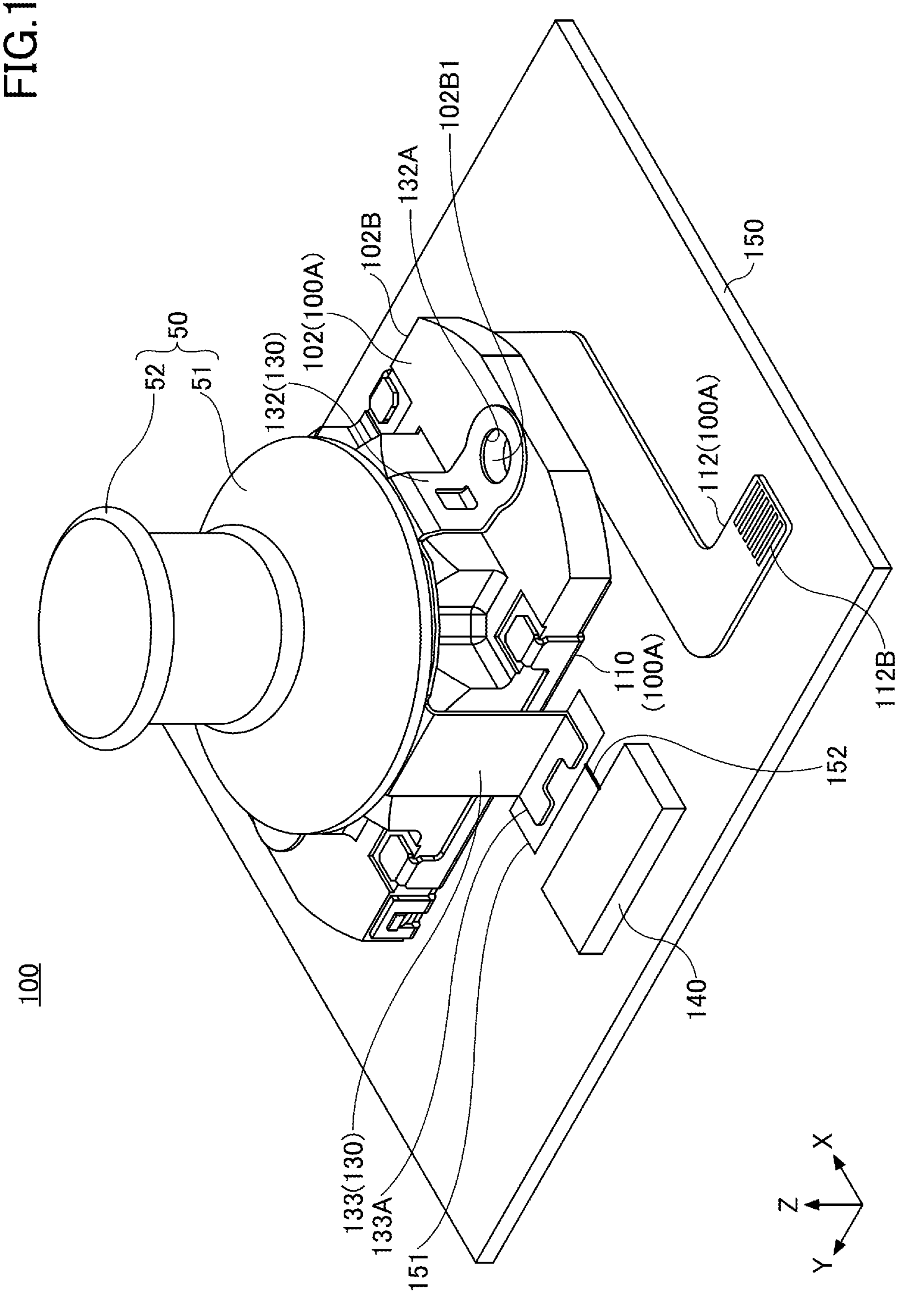
FIG. 1 is an external perspective view illustrating a multidirectional input device according to an embodiment.

FIG. 1 is an external perspective view illustrating a multidirectional input device 100 according to an embodiment. FIG. 1 illustrates a knob 50, a housing 102, a frame 110, a flexible printed circuit (FPC) 112, an electrostatic detection electrode 130, an electrostatic detection circuit 140, and a motherboard 150 of the multidirectional input device 100. Among the components illustrated in FIG. 1, the housing 102, the frame 110, and the FPC 112 are components of an operation device 100A included in the multidirectional input device 100, and thus a reference sign 100A is noted in parentheses next to these components. In FIG. 1, a connecting portion 112B of the FPC 112 is not connected to the motherboard 150; in practice, the connecting portion 112B is connected to a connecting portion of the motherboard 150 and is connected to a control unit or the like that is mounted on the motherboard 150 and performs tilt detection.

Figure 2:
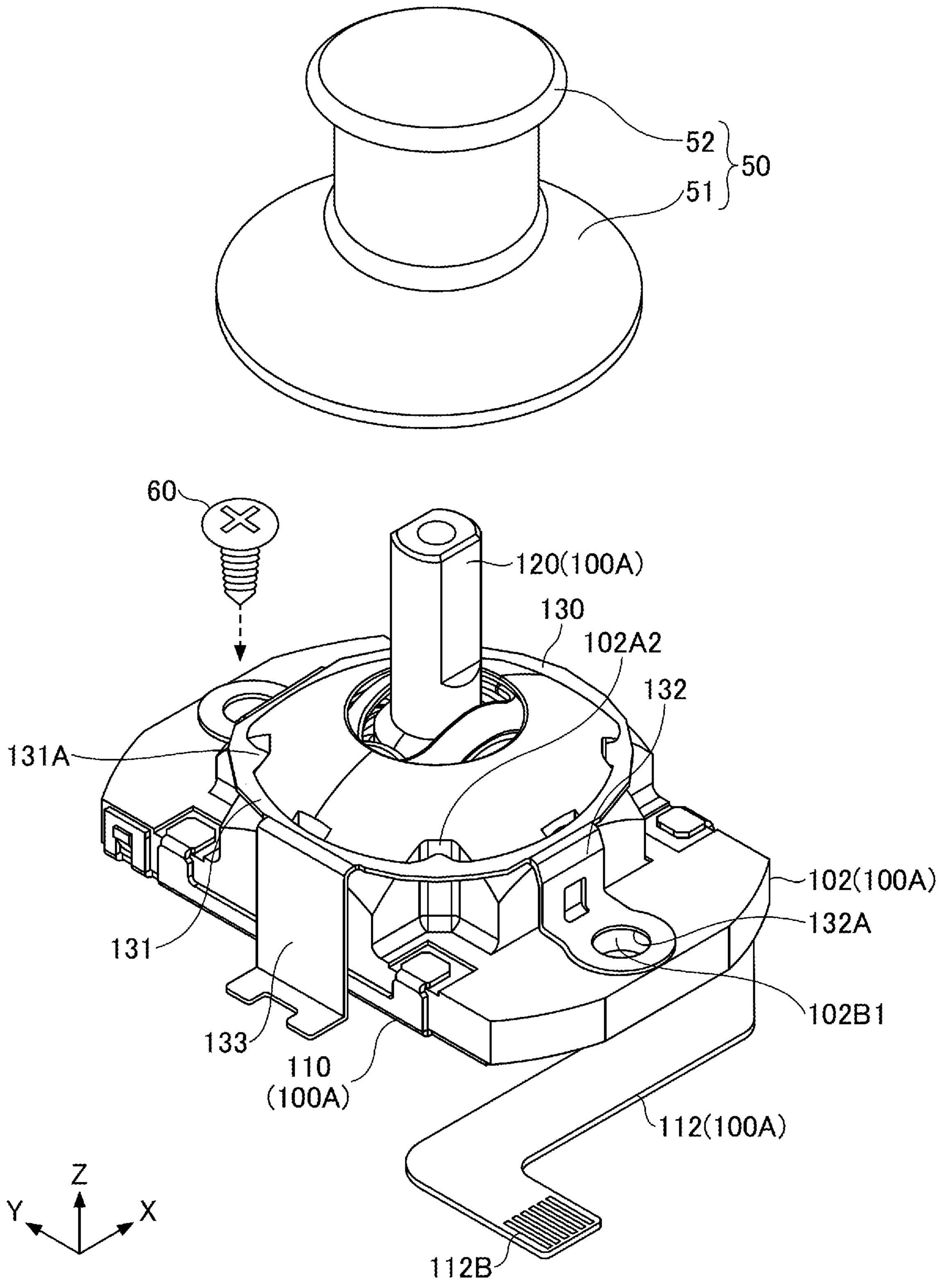
FIG. 2 is an exploded view illustrating a state where a knob of the multidirectional input device is removed.

FIG. 2 is an exploded view illustrating the multidirectional input device 100 with the knob 50 removed. In FIG. 2, an operation lever 120 is illustrated, and the electrostatic detection circuit 140 and the motherboard 150 illustrated in FIG. 1 are omitted. The operation lever 120 is a component of the operation device 100A, and thus the reference sign 100A is noted in parentheses next to this component.

In the following description, a Z direction in the drawings indicates an up-down direction, an X direction in the drawings indicates a front-rear direction, and a Y direction in the drawings indicates a left-right direction for convenience. In FIG. 1, the knob 50 is in a neutral position, and in FIG. 2, the operation lever 120 is in a neutral position. The neutral position is a position when the knob 50 or the operation lever 120 is not operated in the front-rear direction or the right-left direction.

Figure 3:
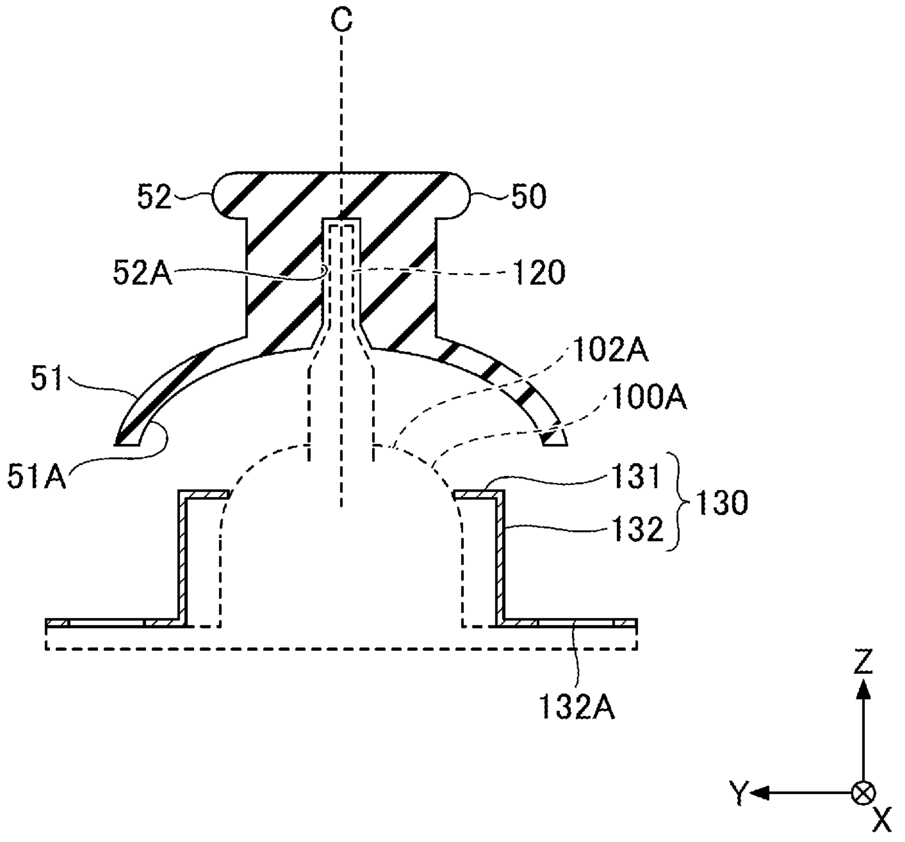
FIG. 3 is a view illustrating a cross-sectional structure of a knob and an electrostatic detection electrode.
Figure 4:
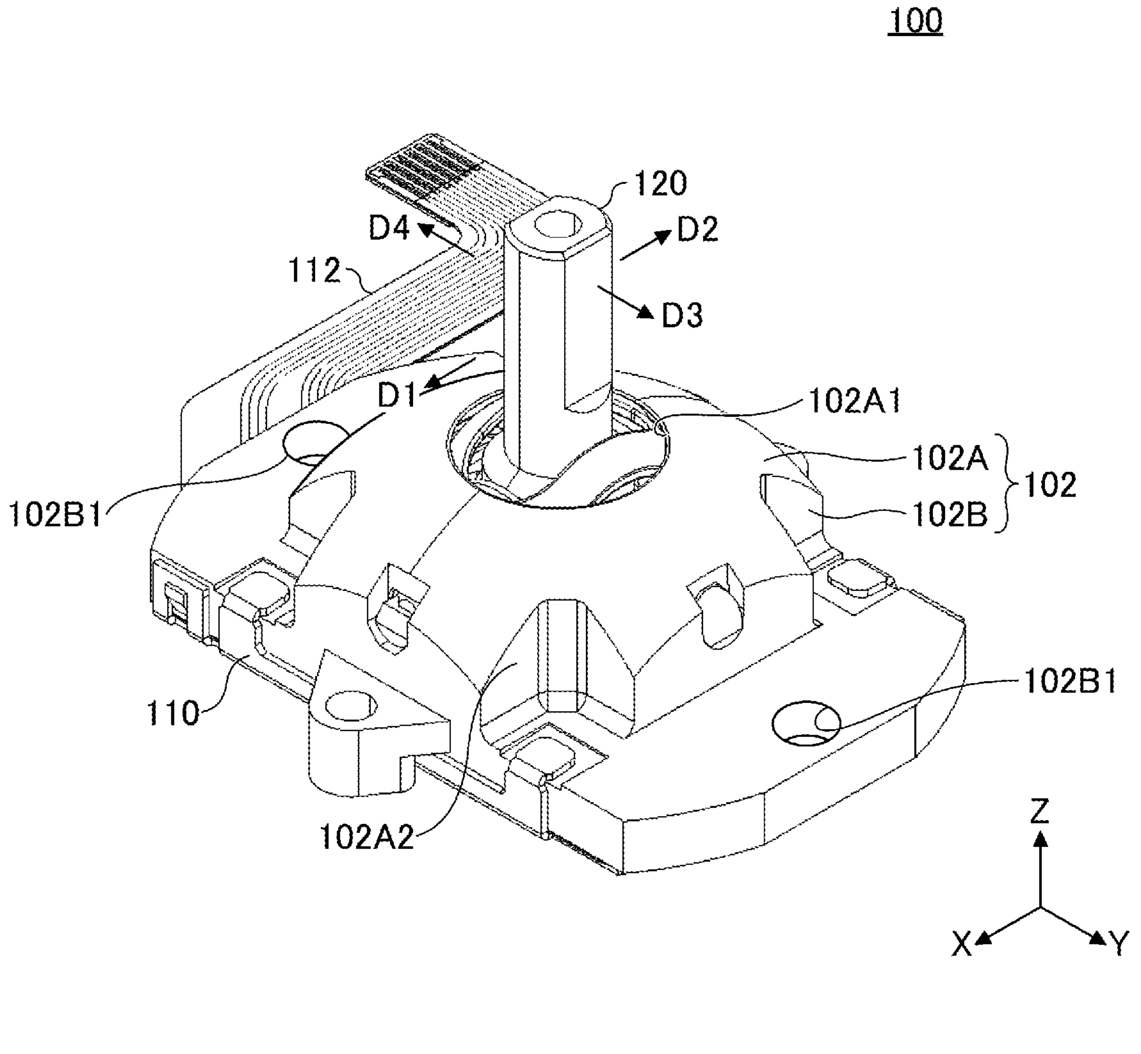
FIG. 4 is an external perspective view illustrating the multidirectional input device according to the embodiment.

FIG. 3 is a view illustrating a cross-sectional structure of the knob 50 and the electrostatic detection electrode 130. FIG. 3 illustrates a cross section parallel to the YZ plane including a central axis C of the knob 50, and illustrates an outline of the operation device 100A included in the multidirectional input device 100 by a broken line. In FIG. 3, the knob 50 and the operation lever 120 are in the neutral position. FIG. 4 is a view illustrating the operation device 100A.

<Overview of Multidirectional Input Device 100>

The multidirectional input device 100 is used as a controller or the like of a game machine or the like, for example. The multidirectional input device 100 includes the knob 50, the operation device 100A, the electrostatic detection electrode 130, the electrostatic detection circuit 140, and the motherboard 150. Although the multidirectional input device 100 is described as including the knob 50, the multidirectional input device 100 may be treated as a multidirectional input device 100 without the knob 50.

The knob 50 is fixed to an upper end side of the operation lever 120. The knob 50 is a knob made of a conductive material that covers a dome portion 102A of the housing 102 of the operation device 100A, and includes a hemispherical portion 51 provided on a lower side of the knob 50, and an operation portion 52 provided on an upper side of the hemispherical portion 51. The knob 50 has a three dimensional shape that is rotationally symmetric with respect to the central axis C illustrated in FIG. 3.

As illustrated in FIG. 3, the knob 50 has a hemispherical recess 51A corresponding to the shape of the dome portion 102A on an inner surface side facing the dome portion 102A. The knob 50 further has a recess 52A recessed upward from the top of the hemispherical recess 51A. The upper end of the operation lever 120 is inserted into and fixed to the recess 52A.

The knob 50 is a portion that is touched by a user's hand or the like to perform an operation when the multidirectional input device 100 is used as a controller or the like of a game machine or the like. The knob 50 is capacitively coupled to the electrostatic detection electrode 130.

The electrostatic detection electrode 130 is attached to the periphery of the dome portion 102A of the housing 102. The electrostatic detection electrode 130 is connected to the electrostatic detection circuit 140 via the motherboard 150.

The electrostatic detection circuit 140 can detect proximity or contact of the hand or the like of an operator to the knob 50 based on a change in electrostatic capacitance detected by the electrostatic detection electrode 130. The proximity means that the hand or the like of the operator is near the knob 50 in a non-contact state, and the contact means that the hand or the like of the operator touches the knob 50.

As illustrated in FIG. 4, the multidirectional input device 100 has a tiltable columnar operation lever 120 which extends upward from an opening 102A1 of the housing 102. The multidirectional input device 100 is configured such that the operation lever 120 is supported with respect to the housing 102 in a tiltable manner, and can be operated to be tilted not only in the front-rear direction (the direction of arrows D1 and D2 in the drawing) and the left-right direction (the direction of arrows D3 and D4 in the drawing), but also in all directions between these directions. The multidirectional input device 100 can output an operation signal corresponding to a tilting operation (a tilting direction and a tilting angle) of the operation lever 120 to the outside via a flexible printed circuit (FPC) 112.

Next, the configuration of the operation device 100A will be described. The operation device 100A will be described with reference to FIGS. 5 to 9 in addition to FIG. 4. The electrostatic detection electrode 130, the electrostatic detection circuit 140, and the motherboard 150 of the multidirectional input device 100 will be described in detail after the configuration of the operation device 100A is described.

<Configuration of Operation Device 100A>

Figure 5:
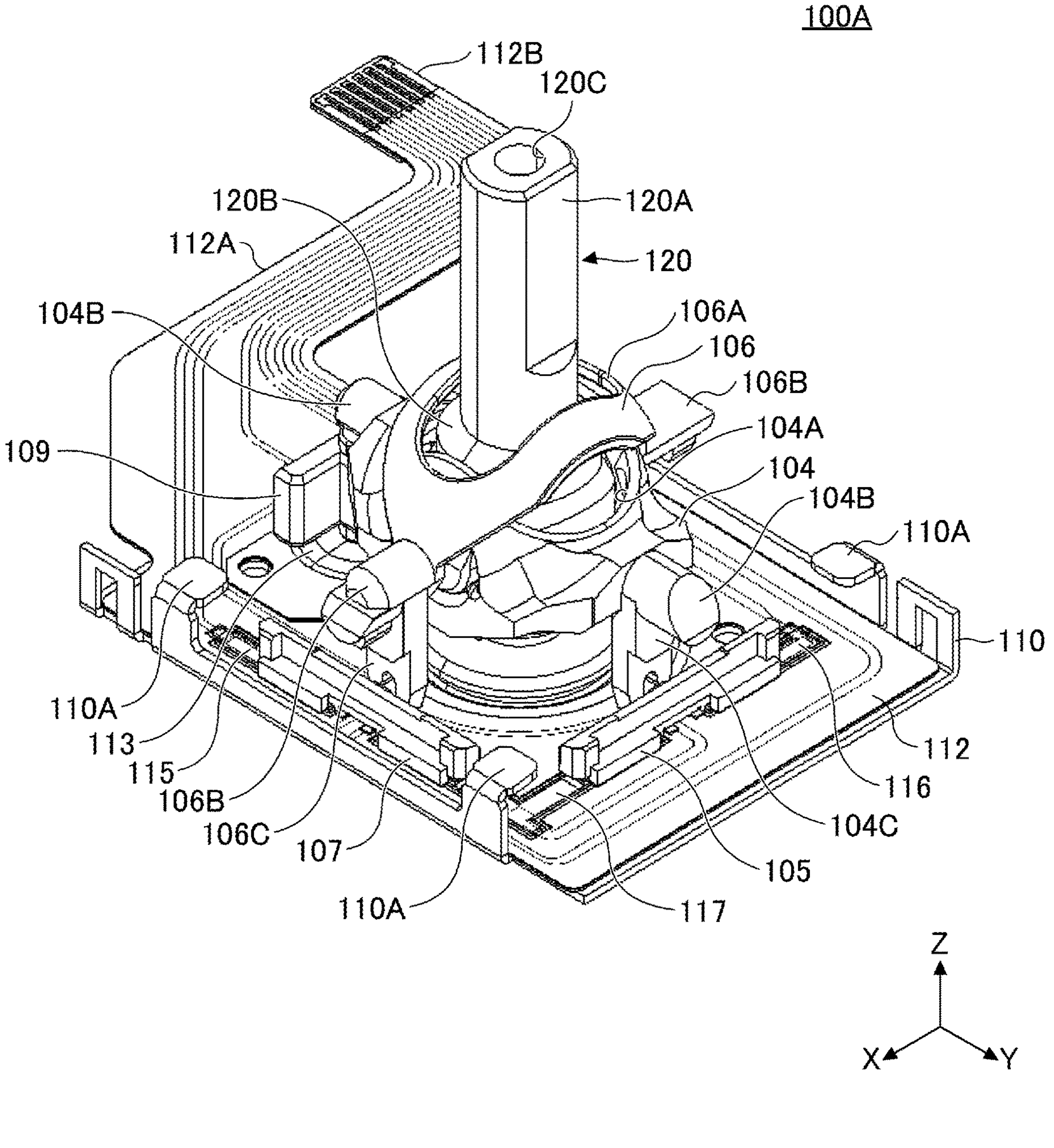
FIG. 5 is an external perspective view illustrating the multidirectional input device (with a housing removed) according to an embodiment.
Figure 6:
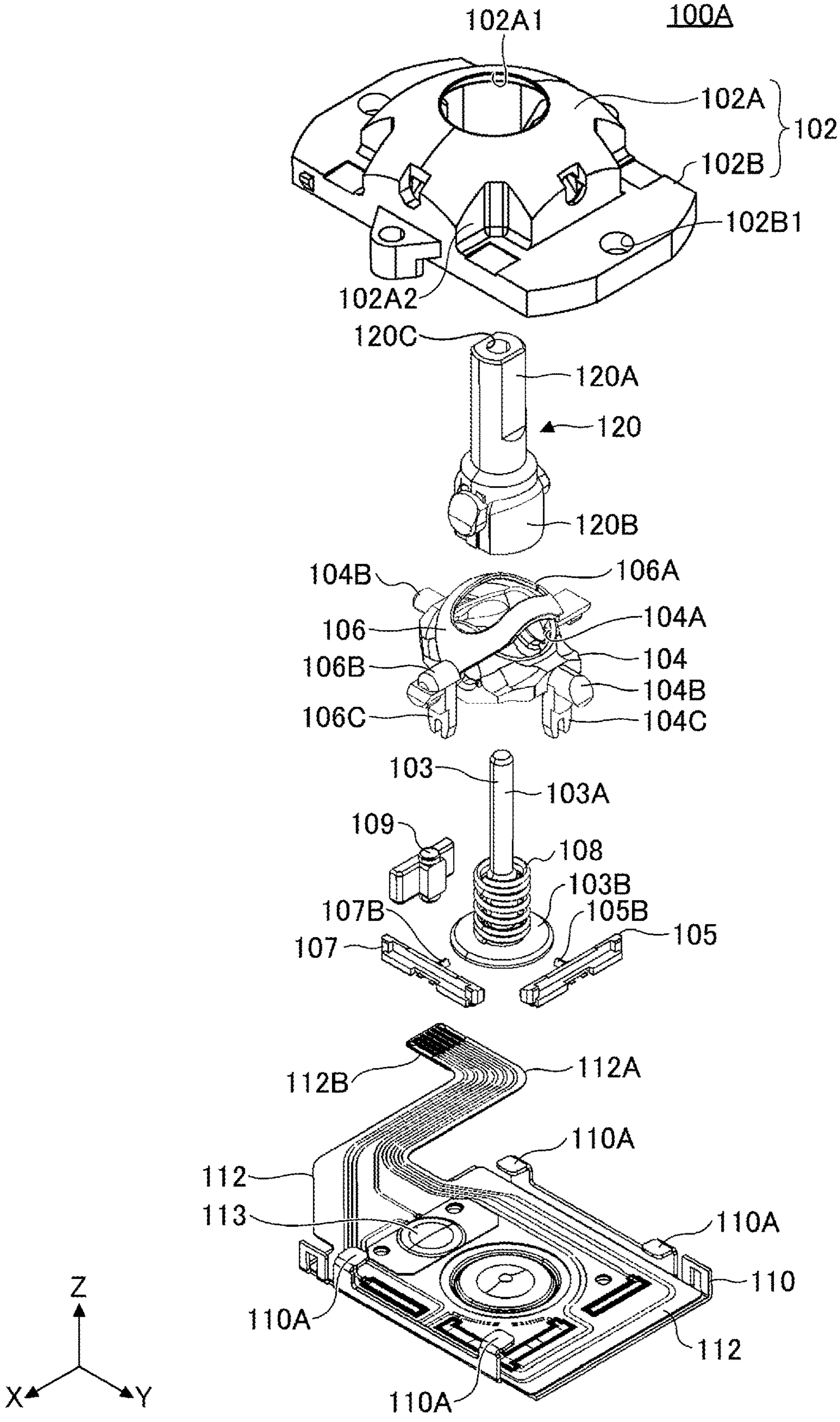
FIG. 6 is an exploded perspective view illustrating the multidirectional input device according to the embodiment.
Figure 7:
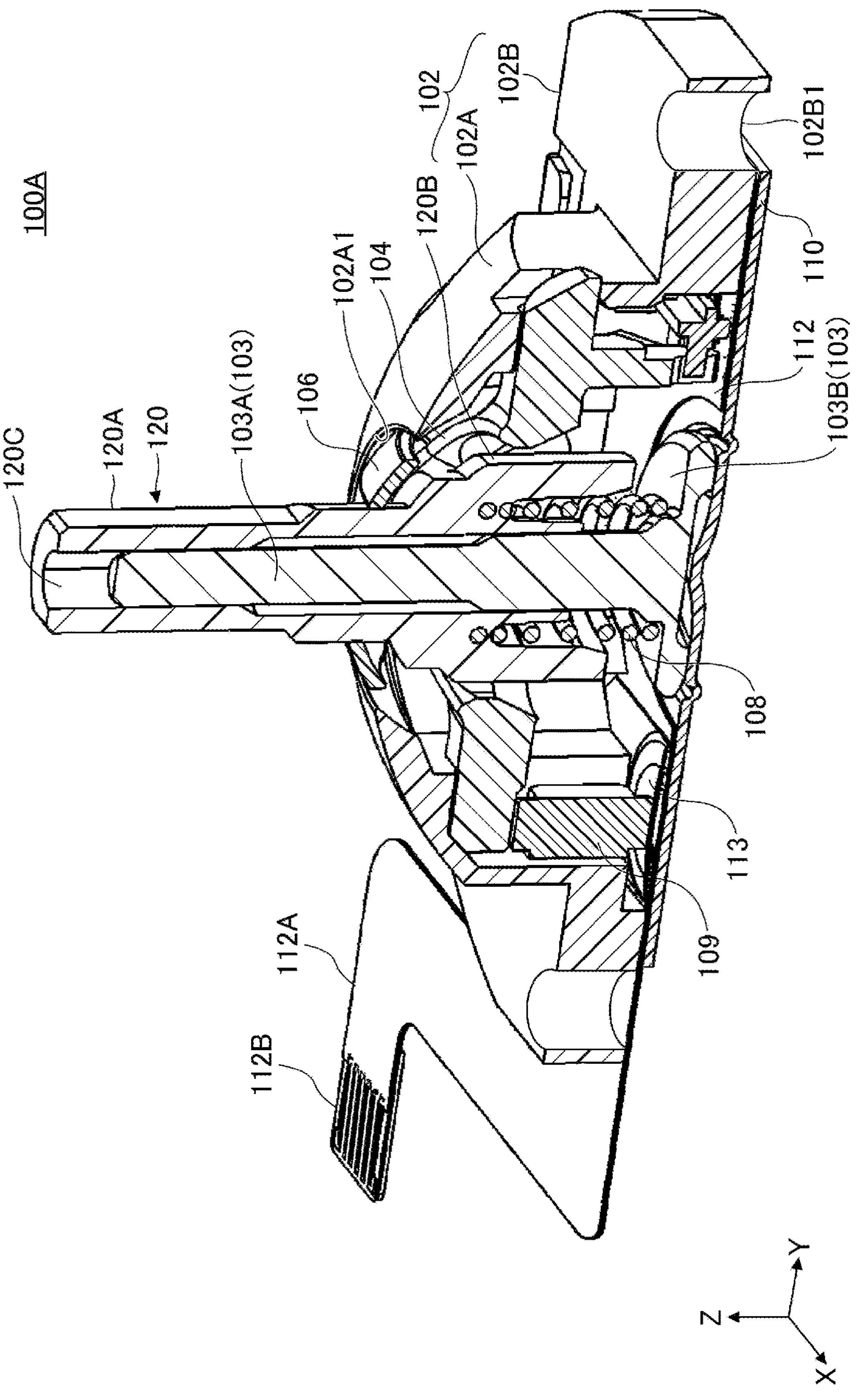
FIG. 7 is a cross-sectional view illustrating the multidirectional input device according to the embodiment.

FIG. 5 is an external perspective view illustrating the operation device 100A (in a state where the housing 102 is removed) according to the embodiment. FIG. 6 is an exploded perspective view illustrating the operation device 100A according to the embodiment. FIG. 7 is a cross-sectional view illustrating the operation device 100A according to the embodiment.

As illustrated in FIGS. 5 to 7, the operation device 100A includes the housing 102, the operation lever 120, an actuator 104, a holder 105, an actuator 106, an actuator 103, a spring 108, a holder 107, a pressing member 109, a frame 110, an FPC 112, and a metal sheet 113.

The housing 102 includes the dome portion 102A having an upward protruding dome shape, and a base portion 102B provided below the dome portion 102A. The housing 102 may be made of an insulating material, for example, a resin. The lower portion of the housing 102 where the base portion 102B is provided is an example of a portion on the opposite side to the dome portion 102A of the housing 102.

The housing 102 has an internal space in which the components (the operation lever 120, the actuators 103, 104, and 106, and the holders 105 and 107) are incorporated. The housing 102 has the opening 102A1 having a circular shape in plan view from above formed at the top of the dome portion 102A. The operation lever 120 is inserted into the opening 102A1.

The housing 102 has fixing holes 102B1 through which fixing members 60 (see FIG. 2) are inserted at the end portions of the base portion 102B on the +Y direction side and the −Y direction side. The fixing holes 102B1 are each an example of a first fixing hole. The fixing members 60 are, for example, a screw, and when the multidirectional input device 100 is fixed to a housing or the like of a game controller or the like, the housing 102 may be fixed to the housing or the like of the game controller or the like by inserting the screws into the fixing holes 102B1 and tightening the screws.

The housing 102 has a notch portion 102A2 provided at each of four outer corners of the dome portion 102A in plan view. The notch portions 102A2 are provided to fix the electrostatic detection electrode 130.

The operation lever 120 is a member on which an operator performs a tilting operation. The operation lever 120 may be made of an insulating material, and is made of resin, for example. The operation lever 120 includes a lever portion 120A and a base portion 120B. The lever portion 120A is a substantially cylindrical portion extending upward from the opening 102A1 of the housing 102, and is a portion on which the operator performs a tilting operation via the knob 50. The base portion 120B is a substantially cylindrical portion that supports a lower end portion of the lever portion 120A inside the housing 102 and rotates in accordance with the tilting operation of the lever portion 120A.

The actuator 104 has a dome shape that is curved convexly upward, and has a long hole-shaped opening 104A extending in the left-right direction (the Y direction in the drawings) along the curved shape. The actuator 104 has a rotation shaft 104B protruding outward at its two ends in the left-right direction, and is provided so as to be rotatable in the front-rear direction (X direction in the drawing) around the rotation shaft 104B with the rotation shaft 104B being supported by the housing 102.

The actuator 106 is provided to overlap an upper side of the actuator 104. The actuator 106 has a shape that is curved convexly upward, and has a long hole-shaped opening 106A extending in the front-rear direction (X direction in the drawing) along the curved shape. The actuator 106 has a rotation shaft 106B protruding outward at its two ends in the front-rear direction, and is provided so as to be rotatable in the left-right direction (Y direction in the drawing) around the rotation shaft 106B with the rotation shaft 106B being supported by the housing 102.

The holder 105 holds a slider 105A on its lower side. The holder 105 has a longitudinal shape extending in a sliding direction (X direction) of the slider 105A. The holder 105 is provided so as to be slidable in the sliding direction (X direction) of the slider 105A. A protrusion 105B is provided at the center of a side surface of the holder 105.

The holder 107 holds a slider 107A on its lower side. The holder 107 has a longitudinal shape extending in a sliding direction (Y direction) of the slider 107A. The holder 107 is provided so as to be slidable in the sliding direction (Y direction) of the slider 107A. A protrusion 107B is provided at the center of a side surface of the holder 107.

The actuator 104, the actuator 106, the holder 105, and the holder 107 may be made of an insulating material, and are made of resin, for example.

As illustrated in FIGS. 5 to 7, the actuators 104 and 106 overlap each other such that the opening 104A and the opening 106A intersect each other. The actuators 104 and 106 are assembled into the housing 102 together with the base portion 120B in a state where the actuators overlap each other, the lever portion 120A of the operation lever 120 penetrates the opening 104A and the opening 106A, and the actuators 104 and 106 are combined with the base portion 120B of the operation lever 120.

The actuator 104 has an engaging portion 104C that protrudes downward from the rotation shaft 104B on the +Y direction side. The engaging portion 104C engages with the protrusion 105B provided at the center of a side surface of the holder 105 provided so as to be slidable in the front-rear direction (X direction) on the FPC 112. When the operation lever 120 is tilted in the front-rear direction (X direction), the actuator 104 rotates in the front-rear direction together with the base portion 120B of the operation lever 120, and slides the holder 105 in the front-rear direction. As a result, the electrical connection between the slider 105A (see FIG. 9) held at the lower portion of the holder 105 and the resistors 116 and 117 provided on the FPC 112 changes, and an operation signal having a resistance value corresponding to the tilting operation (tilting direction and tilting angle) of the operation lever 120 in the front-rear direction is output from the connecting portion 112B of the FPC 112.

The actuator 106 has an engaging portion 106C that protrudes downward from the rotation shaft 106B on the +X direction side. The engaging portion 106C engages with the protrusion 107B provided at the center of a side surface of the holder 107 provided so as to be slidable in the left-right direction (Y direction) on the FPC 112. When the operation lever 120 is tilted in the left-right direction (Y direction), the actuator 106 rotates in the left-right direction together with the base portion 120B of the operation lever 120, and slides the holder 107 in the left-right direction. As a result, the electrical connection between the slider 107A (see FIG. 9) held at the lower portion of the holder 107 and the resistors 115 and 117 provided on the slider FPC 112 changes, and an operation signal having a resistance value corresponding to the tilting operation (tilting direction and tilting angle) of the operation lever 120 in the left-right direction is output from the connecting portion 112B of the FPC 112.

The sliders 105A and 107A and the resistors 115, 116, and 117 are examples of a tilt detection sensor that outputs a resistance value corresponding to a tilt operation of the operation lever 120 in the front-rear direction and the left-right direction.

The actuator 103 has a shaft portion 103A and a bottom plate portion 103B. The shaft portion 103A is a round rod-shaped portion that is inserted into the through hole 120C of the operation lever 120. The bottom plate portion 103B is a disc-shaped portion integrally provided at the lower end portion of the shaft portion 103A.

The spring 108 is assembled into an opening (see FIG. 7) on the bottom surface side (−Z direction side) of the operation lever 120 together with the actuator 103 in a state where the shaft portion 103A of the actuator 103 is inserted into the spring 108. The spring 108 preloads the operation lever 120 upward and preloads the bottom plate portion 103B of the actuator 103 downward. Thus, when the tilting operation of the operation lever 120 by the operator is released, the spring 108 presses the bottom plate portion 103B of the actuator 103 against an upper surface and a central portion of the frame 110 to make the bottom plate portion 103B be in a horizontal state, thereby returning the operation lever 120 to the neutral position.

When the operation lever 120 is pressed downward, the pressing member 109 is pressed downward by the rotation shaft 104B on the −Y direction side of the actuator 104, thereby pressing the metal sheet 113 provided on the FPC 112 downward and elastically deforming the metal sheet 113, thereby bringing the switch circuit formed on the FPC 112 into a conductive state. As a result, a switch-on signal indicating that the operation lever 120 has been pressed downward is output from the FPC 112.

The spring 108 is made of metal. The pressing member 109 may be made of an insulating material, and is made of resin, for example.

The frame 110 is a flat plate member made of metal and closes the opening on the bottom surface side of the housing 102. For example, the frame 110 is formed by performing various processing methods (e.g., punching, bending, and the like) on a metal plate. The frame 110 is provided with a pair of claw portions 110A at each of the edge portion on the front side (+X direction side) and the edge portion on the rear side (−X direction side). The frame 110 is fixedly coupled to the housing 102 by the engagement of the claw portions 110A with the edge portions of the housing 102.

The FPC 112 is an example of a wiring circuit board and is a film-like flexible circuit member. The FPC 112 is disposed on the lower side of the housing 102. The lower side of the housing 102 is an example of a second side relative to the housing 102, which is opposite to an upper side (an example of a first side) relative to the housing 102 where one end of the operation lever 120 protrudes from the opening 102A1.

The FPC 112 has an extending portion 112A extending from an upper surface of the frame 110 to a side of the frame 110 (−Y direction), and is connected to the outside by a connecting portion 112B provided at the tip of the extending portion 112A. The FPC 112 transmits an operation signal corresponding to the operation (the tilting operation and the pressing operation) of the operation lever 120 to the outside. The FPC 112 is formed by covering both surfaces of a strip-shaped conductive wire (e.g., copper foil) with a flexible and insulating film (e.g., polyimide, polyethyleneterephthalate (PET), etc.).

<Configuration of FPC 112>

Figure 8:
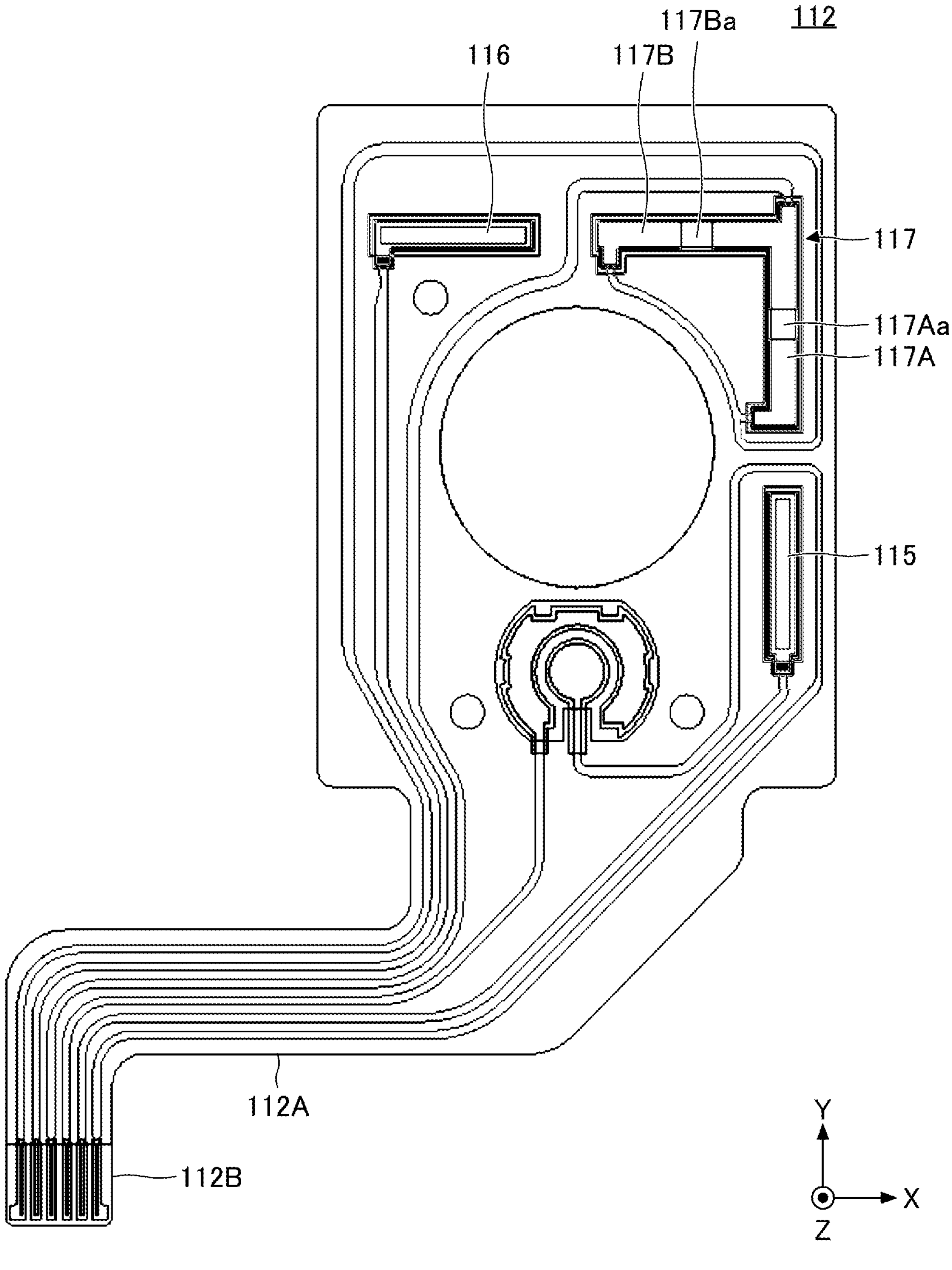
FIG. 8 is a plan view illustrating an FPC included in the multidirectional input device according to the embodiment.

FIG. 8 is a plan view of the FPC 112 included in the operation device 100A according to the embodiment. As illustrated in FIG. 8, the resistor 115, the resistor 116, and the resistor 117, each of which is flat and strip-shaped, are provided on the FPC 112. For example, each of the resistor 115, the resistor 116, and the resistor 117 is formed by printing a carbon fiber material in a thin film shape.

The resistor 115 is provided in the vicinity of an edge portion of the FPC 112 on the +X direction side. The resistor 115 has a strip shape extending linearly in the Y direction.

The resistor 116 is provided in the vicinity of the edge portion of the FPC 112 on the +Y direction side. The resistor 116 has a strip shape extending linearly in the X direction.

The resistor 117 is provided in the vicinity of a corner portion of the FPC 112 on the +X direction side and the +Y direction side. The resistor 117 has an L-shape formed of a linear portion 117A and a linear portion 117B. The linear portion 117A has a strip shape extending linearly in the Y direction. The linear portion 117B has a strip shape extending linearly in the X direction.

<Contact State of Sliders 105A and 107A>

Figure 9:
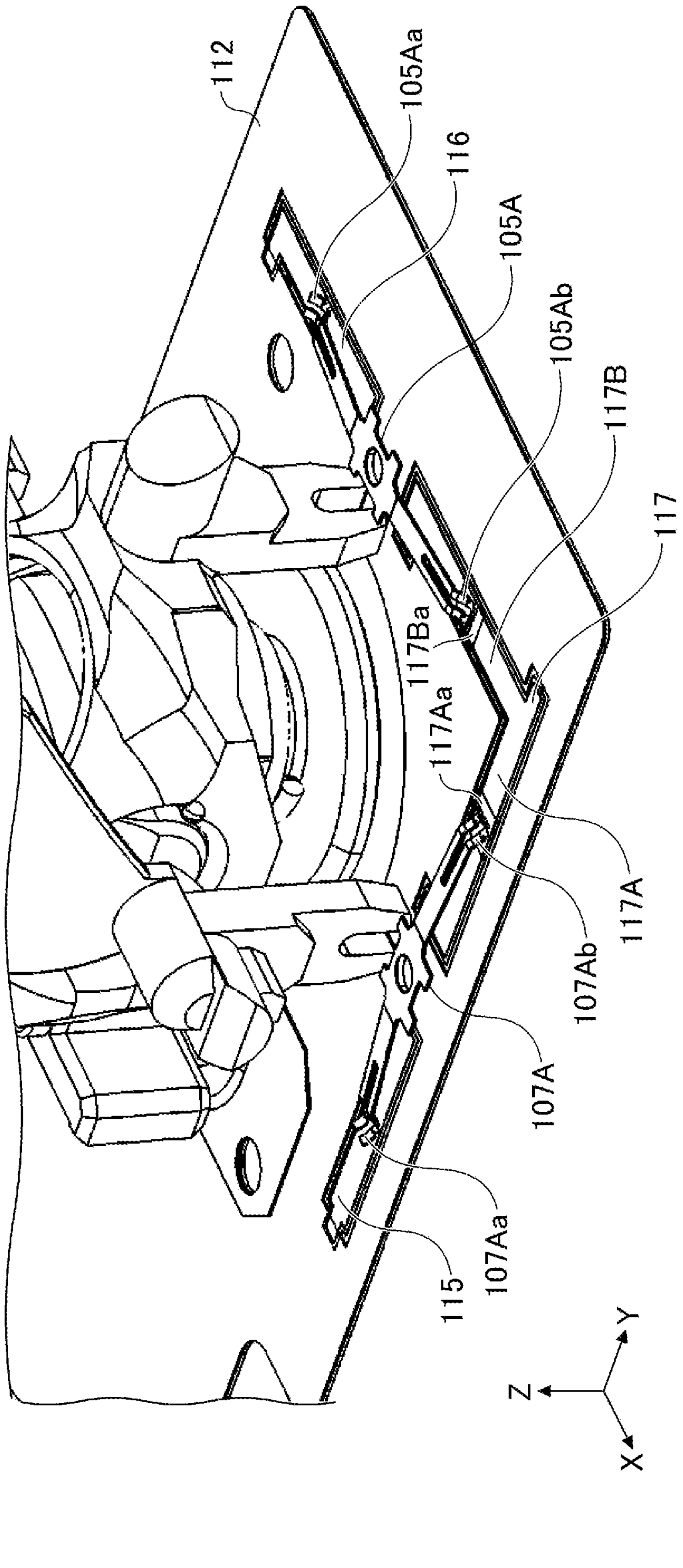
FIG. 9 is a view illustrating a contact state of a slider included in the multidirectional input device according to the embodiment.

FIG. 9 is a view illustrating a contact state of sliders 105A and 107A included in the operation device 100A according to the embodiment.

As illustrated in FIG. 9, on the FPC 112, the linear portion 117A of the resistor 117 and the resistor 115 are provided separately from each other in a straight line in the Y direction. A metal and leaf spring-shaped slider 107A held by a lower portion of the holder 107 slides in the Y direction on the surfaces of the linear portion 117A and the resistor 115. Specifically, a contacting portion 107Aa provided at an end portion of the slider 107A on the −Y direction side slides on the surface of the resistor 115. Further, a contacting portion 107Ab provided at an end portion of the slider 107A on the +Y direction side slides on the surface of the linear portion 117A.

As illustrated in FIG. 9, the linear portion 117B of the resistor 117 and the resistor 116 are provided separately from each other in a straight line in the X direction on the FPC 112. A metal and leaf spring-shaped slider 105A held by a lower portion of the holder 105 slides in the X direction on the surfaces of the linear portion 117B and the resistor 116. Specifically, a contacting portion 105Aa provided at an end portion of the slider 105A on the −X direction side slides on the surface of the resistor 116. Further, a contacting portion 105Ab provided at an end portion of the slider 105A on the +X direction side slides on the surface of the linear portion 117B.

With this configuration, in the operation device 100A according to the embodiment, the slider 107A slides in the Y direction on the surfaces of the linear portion 117A and the resistor 115 in accordance with the tilting operation of the operation lever 120 in the Y direction. Thus, the resistance value between the terminals connected to the resistor 117 and the terminals connected to the resistor 115 changes in accordance with the amount of movement of the slider 107A (i.e., the tilt angle of the operation lever 120). An external device can detect the tilting operation and the tilting angle of the operation lever 120 in the Y direction based on the change in the resistance value between both terminals.

In the operation device 100A according to the embodiment, the slider 105A slides in the X direction on the surfaces of the linear portion 117B and the resistor 116 in accordance with the tilting operation of the operation lever 120 in the X direction. Thus, the resistance value between the terminals connected to the resistor 117 and the terminals connected to the resistor 116 changes in accordance with the amount of movement of the slider 105A (i.e., the tilt angle of the operation lever 120). The external device can detect the tilting operation and the tilting angle of the operation lever 120 in the X direction based on the change in the resistance value between both terminals.

As illustrated in FIGS. 8 and 9, the linear portion 117A of the resistor 117 has a low resistance portion 117Aa. The low resistance portion 117Aa is a portion having a lower resistance value than the other portion of the linear portion 117A. As illustrated in FIGS. 8 and 9, the low resistance portion 117Aa is a portion with which the contacting portion 107Ab of the slider 107A comes into contact when the operation lever 120 is in the neutral position. In the present embodiment, the low resistance portion 117Aa has a resistance value lower than that of the other portion of the linear portion 117A because the number of stacked layers of the resistor 117 is larger (i.e., the low resistance portion 117Aa is thicker) than that of the other portion of the linear portion 117A. For example, in the example illustrated in FIGS. 8 and 9, the resistor 117 is formed in two layers in the low resistance portion 117Aa, and the resistor 117 is formed in one layer in the other portion of the linear portion 117A. Specifically, in the low resistance portion 117Aa, the resistor 117 is formed in two layers by overlapping the resistor covering only the low resistance portion 117Aa in the linear portion 117A and the resistor covering the entire region in the linear portion 117A. Thus, in the example illustrated in FIGS. 8 and 9, the resistance value of the low resistance portion 117Aa is one half of the resistance value of the other portion of the linear portion 117A.

As illustrated in FIGS. 8 and 9, the linear portion 117B of the resistor 117 includes a low resistance portion 117Ba. The low resistance portion 117Ba is a portion having a lower resistance value than the other portion of the linear portion 117B. As illustrated in FIGS. 8 and 9, the low resistance portion 117Ba is a portion with which the contacting portion 105Ab of the slider 105A comes into contact when the operation lever 120 is in the neutral position. In the present embodiment, the low resistance portion 117Ba has a resistance value lower than that of the other portion of the linear portion 117B because the number of stacked layers of the resistor 117 is larger (i.e., the low resistance portion 117Ba is thicker) than that of the other portion of the linear portion 117B. For example, in the example illustrated in FIGS. 8 and 9, the resistor 117 is formed in two layers in the low resistance portion 117Ba, and the resistor 117 is formed in one layer in the other portion of the linear portion 117B. Specifically, in the low resistance portion 117Ba, the resistor 117 is formed in two layers by overlapping the resistor covering only the low resistance portion 117Ba in the linear portion 117B and the resistor covering the entire region in the linear portion 117B. Thus, in the example illustrated in FIGS. 8 and 9, the resistance value of the low resistance portion 117Ba is one half of the resistance value of the other portion of the linear portion 117B.

<Output Characteristics>

Figure 10:
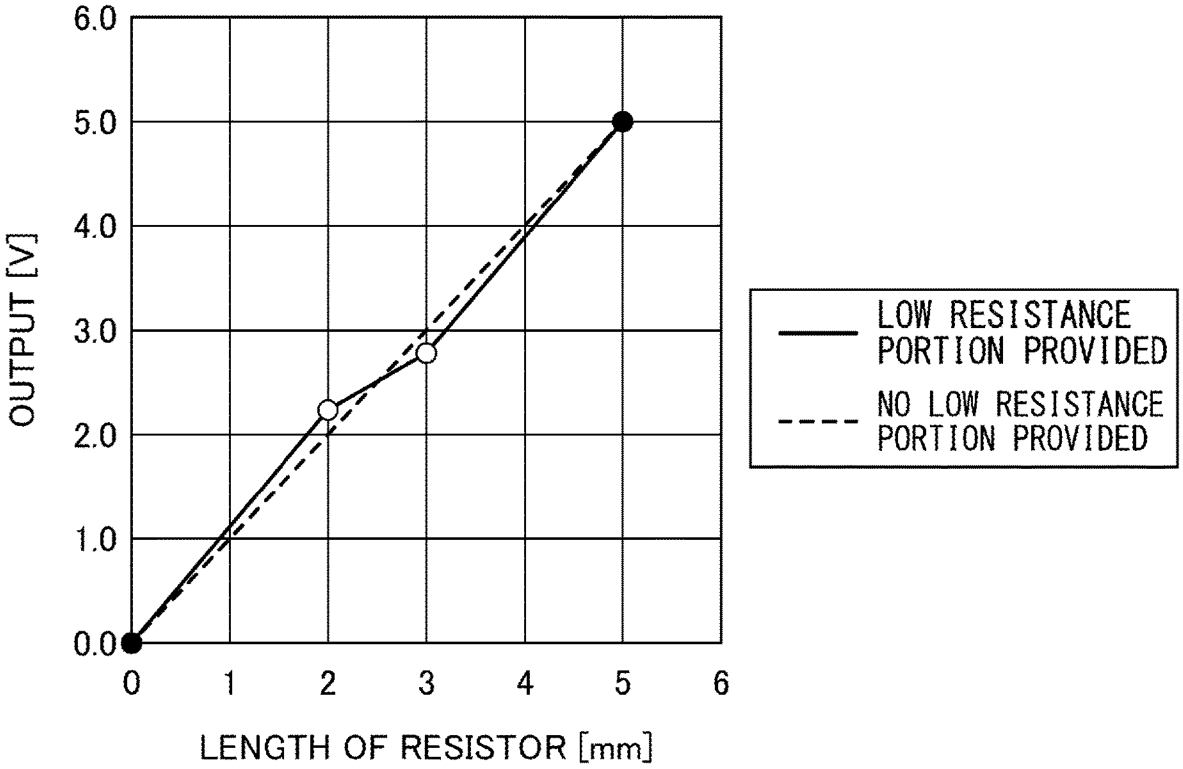
FIG. 10 is a graph illustrating output characteristics of the multidirectional input device according to the embodiment.

FIG. 10 is a graph illustrating output characteristics of the operation device 100A according to the embodiment. The graph in FIG. 10 illustrates a relationship between the length of the resistor 117 (the lengths of the linear portions 117A and 117B) and the output voltage value. In the example illustrated in FIG. 10, the maximum dimension of the resistor 117 is "5 mm", and the dimension of the resistor 117 when the operation lever 120 is in the neutral position is "2.5 mm". The lengths of the low resistance portions 117Aa and 117Ba are set to "1.0 mm". The resistance values of the low resistance portions 117Aa and 117Ba are set to be one half of the resistance values of the other portions of the linear portions 117A and 117B. In FIG. 10, a solid line represents the voltage output when the low resistance portions 117Aa and 117Ba are provided, and a broken line represents the voltage output when the low resistance portions 117Aa and 117Ba are not provided as a comparative example.

As indicated by the broken line in FIG. 10, when the low resistance portions 117Aa and 117Ba are not provided in the linear portions 117A and 117B, the slope of the voltage value is constant in the entire region of the linear portions 117A and 117B.

On the other hand, as illustrated by the solid line in FIG. 10, when the low resistance portions 117Aa and 117Ba are provided in the linear portions 117A and 117B, the slope is constant in the other portions of the linear portions 117A and 117B, but the slope of the low resistance portions 117Aa and 117Ba is gentler than that of the other portions.

As a result, as illustrated in FIG. 10, in the range of 1.0 mm centered when the operation lever 120 is in the neutral position, the range of the voltage value is "1.0 V" when the low resistance portions 117Aa and 117Ba are not provided, whereas the range of the voltage value is "0.5 V" (i.e., one half of the range when the low resistance portions 117Aa and 117Ba are not provided) when the low resistance portions 117Aa and 117Ba are provided.

As described above, the operating device 100A according to the embodiment can reduce the slope of the voltage value near the neutral position of the operating lever 120 and narrow the range of the voltage value near the neutral position of the operating lever 120 by reducing the resistance values of the low resistance portions 117Aa and 117Ba. Thus, the operation device 100A according to the embodiment can bring the output voltage value closer to a predetermined output voltage value corresponding to the neutral position of the operation lever 120 even when the operation lever 120 has a physical return error. Therefore, the operation device 100A according to the embodiment can further improve the accuracy of returning the operation lever 120 to the neutral position without processing the signal in the voltage value output by the operation device 100A.

In the low resistance portions 117Aa and 117Ba, a resistor covering the entire region of the linear portions 117A and 117B may be stacked on a resistor covering only the low resistance portions 117Aa and 117Ba of the linear portions 117A and 117B. This can prevent the sliders 107A and 105A from being caught at the boundary between the low resistance portions 117Aa and 117Ba and other portions.

Next, the electrostatic detection electrode 130, the electrostatic detection circuit 140, and the motherboard 150 will be described.

<Electrostatic Detection Electrode 130>

As illustrated in FIG. 2, the electrostatic detection electrode 130 includes an annular portion 131, leg portions 132, and a connecting portion 133. For example, the electrostatic detection electrode 130 is provided with two leg portions 132. The electrostatic detection electrode 130 is made of metal, and can be manufactured by performing processing such as punching or bending on a sheet metal made of copper, aluminum, iron, or the like, for example.

The annular portion 131 is a portion having an annular shape in plan view, and has four claw portions 131A protruding radially inward from the inner peripheral side. The four claw portions 131A are arranged at equal intervals in a circumferential direction of the annular portion 131 and aligned with the positions of the notch portions 102A2 of the dome portion 102A of the housing 102. The claw portions 131A have a convex shape corresponding to a concave shape of the notch portions 102A2.

The two leg portions 132 extend downward from the +Y direction side and the −Y direction side of an outer peripheral portion of the annular portion 131, and the connecting portion 133 extends downward from the −X direction side of the outer peripheral portion of the annular portion 131.

The position where the leg portion 132 on the +Y direction side is connected to the annular portion 131 is between the two claw portions 131A on the +Y direction side, and the position where the leg portion 132 on the −Y direction side is connected to the annular portion 131 is between the two claw portions 131A on the −Y direction side. The connecting portion 133 is connected to the annular portion 131 at a position between the two claw portions 131A on the −X direction side.

The annular portion 131 is disposed on an upper outer face of the dome portion 102A of the housing 102 so as to surround the opening 102A1, and is fixed to the dome portion 102A in a state where the claw portions 131A are engaged with the notch portions 102A2 of the dome portion 102A. The annular portion 131 is located at an upper portion of the housing 102 and is disposed to be sufficiently separate from the FPC 112 located on a lower side of the housing 102 so as not to be affected by noise or the like.

The annular portion 131 is disposed on the upper outer face of the dome portion 102A, and therefore faces the inner face of the knob 50, i.e., the face of the hemispherical recess 51A, as illustrated in FIG. 3. As illustrated in FIG. 3, the annular portion 131 is located below the lower end of the knob 50 in the Z direction when the operation lever 120 is in the neutral position. Therefore, in a state where the operation lever 120 is in the neutral position, the annular portion 131 is located outside the hemispherical recess 51A of the knob 50 and is not located inside the hemispherical recess 51A.

When the operation lever 120 is tilted to the +Y direction side from a state where the operation lever 120 is in the neutral position as illustrated in FIG. 3, the lower end of the knob 50 on the +Y direction side covers a portion of the annular portion 131 on the +Y direction side. At this point, the portion of the annular portion 131 on the −Y direction side is further away from the lower end of the knob 50 on the −Y direction side than in the state illustrated in FIG. 3. Such a change in the positional relationship between the annular portion 131 and the knob 50 is the same as in the case where the operation lever 120 is tilted to the −Y direction side in FIG. 3. Further, due to the symmetry of the three dimensional shape of the knob 50, the same applies to a case where the operation lever 120 is tilted in the ±X directions, and the same applies to a case where the operation lever 120 is tilted in all directions between the ±X directions and the ±Y directions.

Therefore, even when the knob 50 is tilted in the front-rear direction, the left-right direction, and all directions between these directions, the electrostatic capacitance between the electrostatic detection electrode 130 and the knob 50 does not appreciably change and is substantially constant. When the operation lever 120 is tilted, the electrostatic capacitance between the annular portion 131 and the knob 50 increases in the direction in which the operation lever 120 tilts, but the electrostatic capacitance decreases on the opposite side, and thus the change according to the difference in the amount of tilting of the operation lever 120 is small. In addition, the difference between the electrostatic capacitance between the annular portion 131 and the knob 50 in a state where the operation lever 120 is in the neutral position and the electrostatic capacitance between the annular portion 131 and the knob 50 in a state where the operation lever 120 is tilted in any direction is also reduced.

The annular portion 131 and the knob 50 is configured to be capable of reducing the electrostatic capacitance between the annular portion 131 and the knob 50 depending on the direction and amount of tilting of the operation lever 120 and the amount of change in the electrostatic capacitance between the annular portion 131 and the knob 50 at the tilting and at the neutral position. The reason why such a configuration of the annular portion 131 and the knob 50 is adopted is to accurately detect the state where the operator's hand or the like is close to or in contact with the knob 50 and the state where the operator's hand or the like is away from the knob 50 in any state of the operation lever 120.

The leg portions 132 extend downward from end portions of the annular portion 131 in the ±Y directions, and are bent such that the lower end sides thereof have an L shape in the YZ plan view. The portions bent in the L shape are configured such that the side surface of the base portion 102B of the housing 102 is interposed between the portions bent in the L shape on the +Y direction side and the −Y direction side. A fixing hole 132A is formed in a portion of each leg portion 132 that is bent into an L shape (a tip of the leg portion 132). The fixing hole 132A is an example of a second fixing hole.

Each of the fixing holes 132A is formed to be aligned with the corresponding fixing hole 102B1 of the base portion 102B of the housing 102, and when the multidirectional input device 100 is fixed to the housing or the like of the game controller or the like, the multidirectional input device 100 can be fixed by inserting the same screw into the fixing hole 102B1 and the fixing hole 132A and fastening the screw.

The connecting portion 133 extends downward from the end portion of the annular portion 131 in the −X direction, and is bent such that the lower end 133A side thereof has an L shape in the XZ plan view. As illustrated in FIG. 1, the lower end 133A of the connecting portion 133 is connected to a pad 151 on the upper surface of the motherboard 150. The pad 151 is connected to the electrostatic detection circuit 140 mounted on the surface of the motherboard 150 via the wiring 152.

The lower end 133A of the connecting portion 133 is sufficiently separate from the frame 110 and the FPC 112 in the X direction. The sufficient separation means that the connecting portion 133 is separate from the frame 110 and the FPC 112 to such an extent that the connecting portion 133 does not pick up noise.

The electrostatic detection circuit 140 is connected to the electrostatic detection electrode 130 via the wiring 152 and the pad 151 of the motherboard 150 as described above. The electrostatic detection circuit 140 is composed of an IC (Integrated Circuit) as an example, and applies an AC voltage to the electrostatic detection electrode 130 and performs analog-to-digital (AD) conversion on a current value corresponding to a change in the electrostatic capacitance of the electrostatic detection electrode 130. The electrostatic detection circuit 140 detects the proximity state of the hand or the like of the operator to the knob 50 based on the change in the current value after the AD conversion corresponding to the change in the electrostatic capacitance of the electrostatic detection electrode 130. In this way, the electrostatic detection circuit 140 detects the electrostatic capacitance between the electrostatic detection electrode 130 and the knob 50 which is a surrounding object.

The electrostatic detection circuit 140 is disposed to be sufficiently separate from the FPC 112 and the frame 110. The sliders 105A and 107A, resistors 115, 116, and 117, and the like, which are examples of a tilt detection sensor, are disposed on the FPC 112, and a signal is generated in accordance with the tilting operation of the operation lever 120. Further, since the frame 110 is arranged to overlap the FPC 112 and has a portion which is capacitively coupled, signal components derived from signals generated in the FPC 112 exist in the frame 110. From the viewpoint of the electrostatic detection circuit 140, the signal generated in the FPC 112 and the signal components generated in the frame 110 are noise.

Therefore, the electrostatic detection circuit 140 is disposed to be sufficiently separate from the FPC 112 and the frame 110 so that the electrostatic detection circuit 140 does not receive noise from the FPC 112 and the frame 110. This is because the proximity or contact of the hand or the like of the operator to the knob 50 can be stably detected.

The motherboard 150 is accommodated in a housing or the like of a game controller or the like, and a microcomputer for controlling the operation of the game controller or the like and other electronic components are mounted thereon. The electrostatic detection circuit 140 may be mounted on the motherboard 150 in a state where the electrostatic detection circuit is not affected by noise or the like from the microcomputer or other electronic components.

As described above, the annular portion 131 of the electrostatic detection electrode 130 is provided so as to surround the opening 102A1 of the dome portion 102A of the housing 102, and the proximity or contact of the hand or the like of the operator to the knob 50 is detected based on the change in the electrostatic capacitance between the electrostatic detection electrode 130 and the knob 50. The annular portion 131 surrounds the opening 102A1 of the dome portion 102A. Thus, even when the knob 50 is tilted in the front-rear direction, the left-right direction, and all directions between these directions, the electrostatic capacitance between the electrostatic detection electrode 130 and the knob 50 does not appreciably change and is substantially constant. Further, the electrostatic capacitance between the electrostatic detection electrode 130 and the knob 50 does not appreciably change even according to the difference in the amount of tilting. Further, the amount of change in the electrostatic capacitance between the annular portion 131 and the knob 50 is small when the knob 50 is tilted and at the neutral position.

Therefore, it is possible to accurately detect a state in which the hand or the like of the operator is close to or in contact with the knob 50 and a state in which the hand or the like of the operator is away from the knob 50, and the sensitivity of the electrostatic detection electrode 130 is stabilized.

Therefore, it is possible to provide the multidirectional input device 100 in which the sensitivity of the electrostatic detection electrode 130 is stable.

In addition, since the FPC 112 provided on the lower side of the housing 102 includes the resistors 115, 116, and 117 for tilt detection, the electrostatic detection electrode 130 is less likely to be affected by a signal or the like related to tilt detection from the FPC 112. Since a signal or the like related to the tilt detection becomes noise for the electrostatic detection electrode 130, it is possible to provide the multidirectional input device 100 that has high noise resistance and can stably detect the proximity or contact of the hand or the like of the operator.

The electrostatic detection electrode 130 includes the leg portions 132 extending from the annular portion 131 toward a side opposite to a side on which the dome portion 102A of the housing 102 is located and fixed to the housing 102, and the connecting portion 133 extending from the annular portion 131 toward a side opposite to a side on which the dome portion 102A of the housing 102 is located and connected to the electrostatic detection circuit 140, and the electrostatic detection circuit 140 is disposed to be separate from the FPC 112. Since the annular portion 131 is fixed so as not to move and the electrostatic detection circuit 140 connected to the electrostatic detection electrode 130 via the connecting portion 133 is less likely to be affected by a signal of FPC 112, it is possible to provide the multidirectional input device 100 capable of detecting electrostatic capacitance with high accuracy and stably detecting the proximity or contact of a hand or the like of an operating person.

Further, the electrostatic detection electrode 130 includes the fixing holes 132A which are disposed to overlap the fixing holes 102B1 of the housing 102, and through which the common fixing members 60 are inserted; thus, the fixing members 60 can be commonly used between the fixing holes 132A and the fixing holes 102B1. In addition, the housing 102 and the electrostatic detection electrode 130 can be stably fixed.

Further, the fixing holes 102B1 are provided in the lower portion of the housing 102, and the fixing holes 132A are provided in the tip end portions of the leg portions 132, and therefore, the housing 102 and the electrostatic detection electrode 130 can be stably fixed to each other on the lower portion of the housing 102.

Further, since the connecting portion 133 is separate from the FPC 112, the electrostatic detection electrode 130 is less likely to receive noise from the tilt detection sensor mounted on the FPC 112, and it is possible to provide the multidirectional input device 100 in which the sensitivity of the electrostatic detection electrode 130 is more stable.

Further, the housing 102 has the notch portions 102A2 provided around the dome portion 102A, and the electrostatic detection electrode 130 has the claw portions 131A engaging with the notch portions 102A2. Therefore, the electrostatic detection electrode 130 can be engaged with the dome portion 102A and stabilized, and the multidirectional input device 100 in which the sensitivity of the electrostatic detection electrode 130 is more stable can be provided.

The multidirectional input device 100 further includes the knob 50 made of a conductive material that is fixed to the operation lever 120 and that covers the dome portion 102A, and the knob 50 has the hemispherical recess 51A corresponding to the shape of the dome portion 102A on the inner surface side facing the dome portion 102A. Therefore, stable electrostatic capacitance can be obtained between the annular portion 131 of the electrostatic detection electrode 130 and the knob 50, and the multidirectional input device 100 in which the sensitivity of the electrostatic detection electrode 130 is more stable can be provided.

When the operation lever 120 is in the neutral position, the electrostatic detection electrode 130 is positioned outside the hemispherical recess 51A of the knob 50, and thus it is possible to reduce the amount of change in electrostatic capacitance between the annular portion 131 and the knob 50 according to the difference in the direction or amount of tilting, and it is possible to provide the multidirectional input device 100 in which the sensitivity of the electrostatic detection electrode 130 is more stable.

Although the multidirectional input device according to the embodiment of the present disclosure has been described above, the present disclosure is not limited to the embodiment in which specific examples have been disclosed, and various modifications and changes can be made without departing from the scope of the claims.

What is claimed is:

1. A multidirectional input device comprising:

a housing made of an insulating material;

an operation lever supported by the housing in a tiltable manner;

a tilt detection sensor configured to detect a tilt of the operation lever; and an electrostatic detection circuit configured to detect an electrostatic capacitance formed between an electrostatic detection electrode and a surrounding object, wherein the housing includes a dome-shaped dome portion and an opening provided at a top of the dome portion, the operation lever is inserted through the opening, and the electrostatic detection electrode has an annular portion disposed to surround the opening.

2. The multidirectional input device according to claim 1, further comprising:

a wiring circuit board disposed on a second side relative to the housing, the second side being located opposite to a first side relative to the housing where one end of the operation lever protrudes from the opening, wherein the tilt detection sensor includes a resistor for tilt detection disposed on the wiring circuit board.

3. The multidirectional input device according to claim 2, wherein the electrostatic detection electrode includes leg portions each extending from an annular portion toward a side opposite to a side on which the dome portion of the housing is located, the leg portions being fixed to the housing, and a connecting portion extending from the annular portion toward a side opposite to a side on which the dome portion of the housing is located, the connecting portion being connected to the electrostatic detection circuit, and wherein the electrostatic detection circuit is disposed so as to be separate from the wiring circuit board.

4. The multidirectional input device according to claim 3, wherein the housing has first fixing holes through which fixing members are inserted, respectively, and wherein the electrostatic detection electrode has second fixing holes provided in the leg portions, respectively, the second fixing holes being disposed to overlap the first fixing holes, respectively, such that the fixing members are inserted through the first fixing holes and the second fixing holes, respectively.

5. The multidirectional input device according to claim 4, wherein the first fixing holes are each provided in a portion of the housing on a side opposite to a side on which the dome portion is located, and wherein the second fixing holes are each provided in a tip end portion of a corresponding one of the leg portions.

6. The multidirectional input device according to claim 3, wherein the connecting portion is separate from the wiring circuit board.

7. The multidirectional input device according to claim 1, wherein the housing has notch portions provided around the dome portion, and wherein the electrostatic detection electrode has claw portions that engage with the notch portions, the notch portions protruding inward from an inner peripheral side of the annular portion.

8. The multidirectional input device according to claim 1, further comprising:

a knob made of a conductive material, the knob being fixed to the operation lever and covering the dome portion, wherein the knob has a hemispherical recess on an inner surface side facing the dome portion, the hemispherical recess corresponding to a shape of the dome portion.

9. The multidirectional input device according to claim 8, wherein the electrostatic detection electrode is located outside the hemispherical recess of the knob when the operation lever is in a neutral position.

* * * * *